United States Patent [19]

Törnebäck

[11] Patent Number: 4,800,939
[45] Date of Patent: Jan. 31, 1989

[54] ANTI-SKID DEVICE

[75] Inventor: Göte Törnebäck, Linköping, Sweden

[73] Assignee: On Spot AB, Linkoping, Sweden

[21] Appl. No.: 70,049

[22] Filed: Jul. 6, 1987

[30] Foreign Application Priority Data

Jul. 3, 1986 [SE] Sweden .............................. 86029683

[51] Int. Cl.⁴ .......................... B60C 27/02; F16J 3/04
[52] U.S. Cl. ........................................ 152/214; 92/40;
152/231; 180/16; 188/4 B; 254/10.5; 280/757;
301/42
[58] Field of Search ............... 188/4 R, 4 B; 152/208,
152/210, 213 R, 214, 231, 233; 301/42; 180/16;
280/757; 192/88 A; 74/99; 92/40, 44, 34;
254/1, 10.5

[56] References Cited

U.S. PATENT DOCUMENTS

| 1,909,890 | 5/1933 | Phillips | 92/44 |
| 2,610,824 | 9/1952 | Grier | 92/44 X |
| 3,202,061 | 8/1965 | Johnston | 92/44 X |
| 4,299,310 | 11/1981 | Törnebäck | 152/208 X |
| 4,657,118 | 4/1987 | Andersson | 152/208 X |

Primary Examiner—David Simmons
Assistant Examiner—Thomas Bokan
Attorney, Agent, or Firm—Cushman, Darby & Cushman

[57] ABSTRACT

A chain-carrying pulley (1) is journalled on a shaft (3) fastened to an arm (4) pivotally connected to another arm (5) which in turn is rigidly fastened to the rear axle casing (6) of a vehicle. An inflatable bellows (7) extends between the arms. When inflated, for instance by pressurized air, the bellows displaces the movable arm (4) from a folded position relative to arm (5) bringing the pulley (1) into contact with the wheel. The pulley is returned to a storage position by springs (10) joined to the arms when the bellows is deflated.

5 Claims, 2 Drawing Sheets

ANTI-SKID DEVICE

BACKGROUND OF THE INVENTION

This invention relates to an anti-skid device for vehicles and is of the kind that includes a pulley provided with pieces of chain, or other friction increasing means, intended to be thrown under the vehicle wheel when the pulley is rotated by being brought in contact with the side of the wheel. Devices of this kind are not as simple to achieve as would appear from the principle itself. Chains, pulleys and their supports are, to start with, subject to very great forces necessitating heavy duty construction. Furthermore, a relatively large movement is required to displace the chain-carrying pulley between its working position in contact with the vehicle wheel and its inoperative stored position. To store the pulley is particularly troublesome since different cars have different available places for the pulley. Furthermore, the pulley should be sufficiently elevated so that the chains do not drag on the ground, since they otherwise would be worn prematurely. A result of the above requirements and problems associated with automatic anti-skid devices of the above type is that they are comparatively costly to produce, which in turn results in many people being reluctant to obtain these safety increasing aids. In view of this, the invention has as its object to provide a movement and storage arrangement for an anti-skid device of the kind described that is simple, strong and inexpensive to produce.

SUMMARY OF THE INVENTION

A chain-carrying pulley is journalled to a first arm which is pivotally connected to a second arm rigidly secured to the rear axle of a vehicle. An inflatable bellows extends between the arms so that when the bellows is inflated, the first arm is displaced from a folded position relative to the second arm towards a straightened position which brings the pulley into contact with the vehicle's wheel. A spring arrangement also is associated with the arms to return them to the folded position when the bellows is deflated.

DETAILED DESCRIPTION OF THE INVENTION

Details of the invention now will be presented in the following description of a preferred embodiment of the invention shown in the drawings.

In the drawings:

FIG. 1 illustrates the invention in its working position, while

Figure 2:
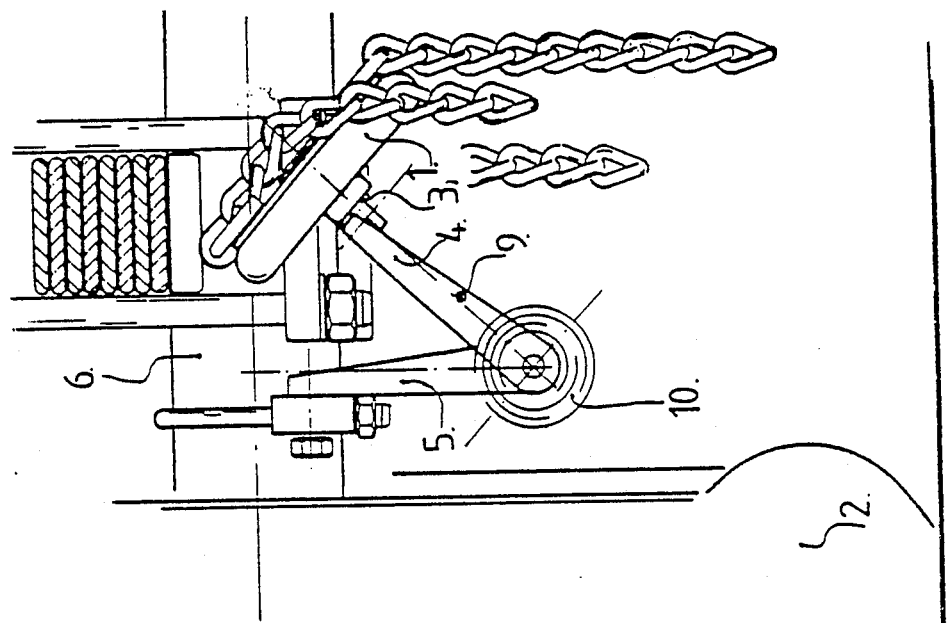
FIG. 2 shows the device in its stored position.
Figure 1:
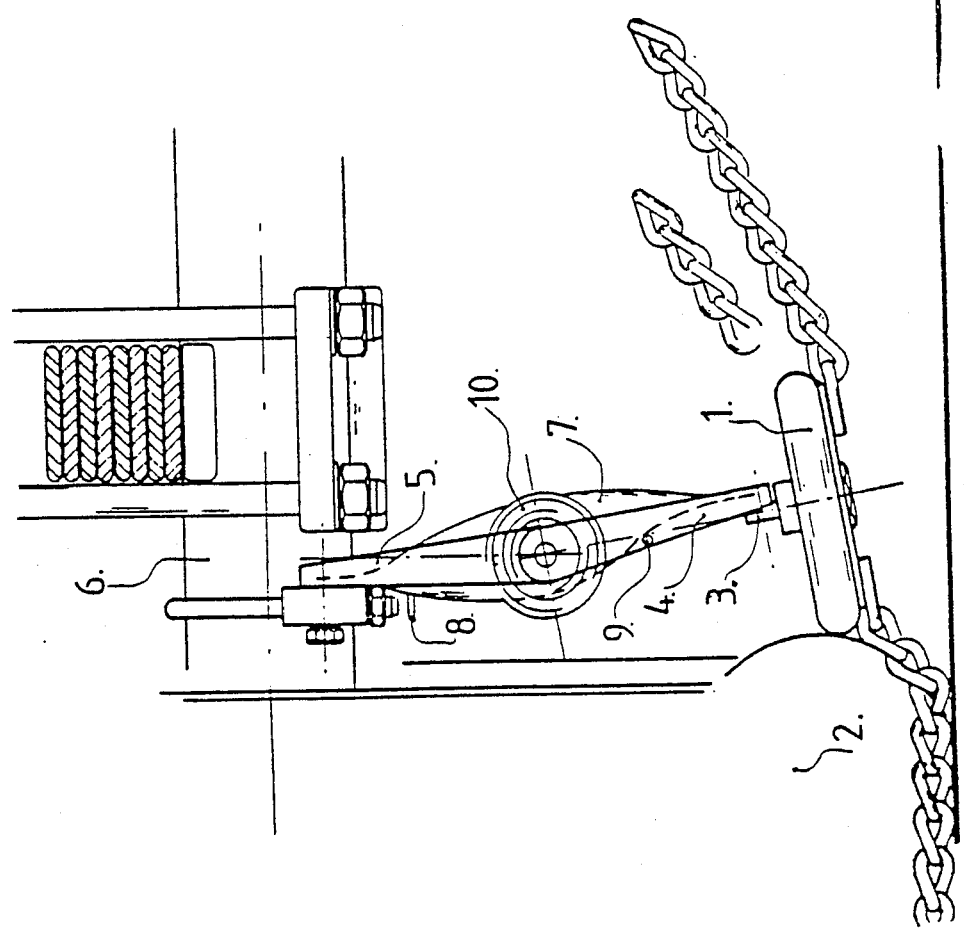
Figure 3:
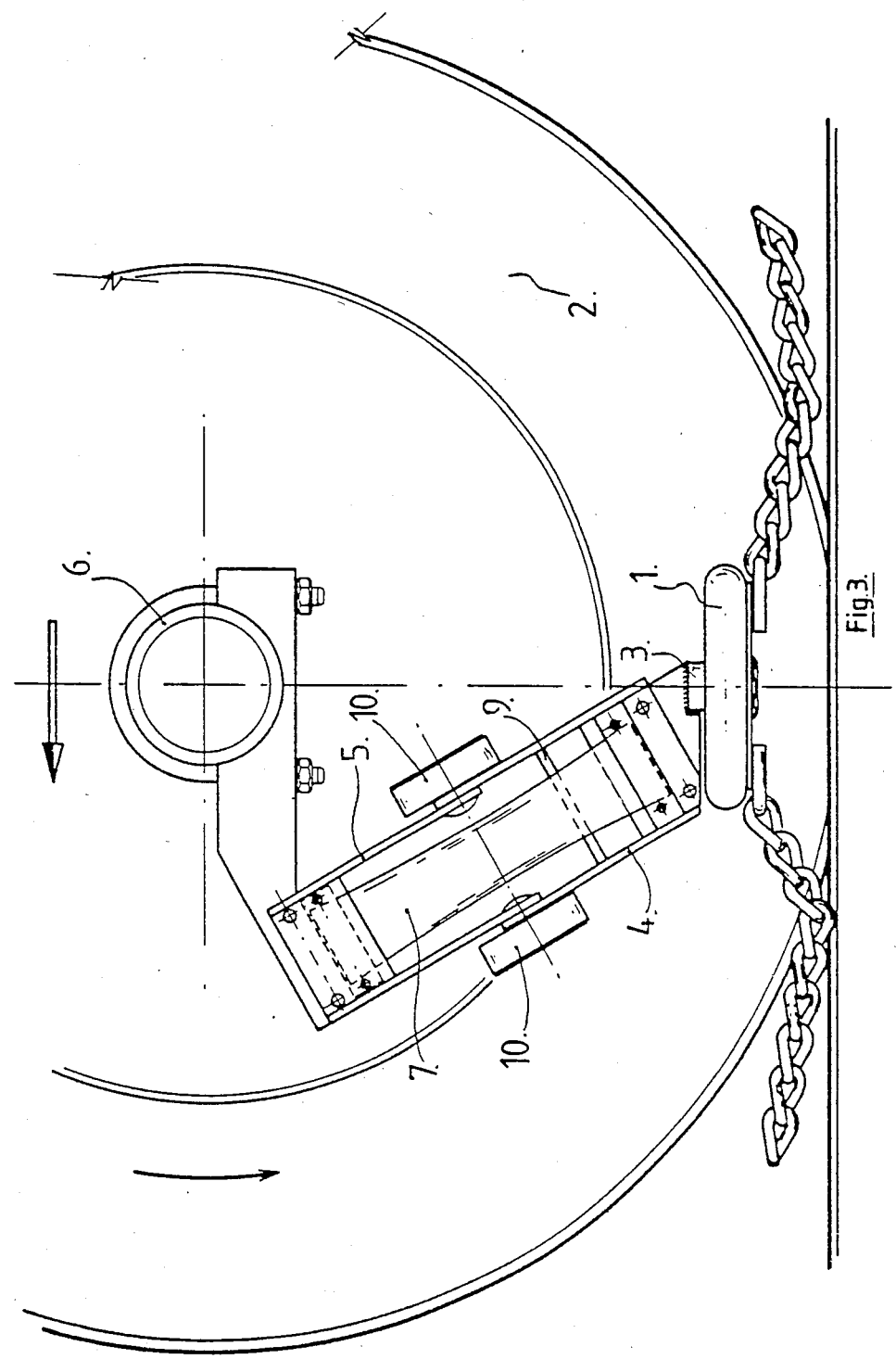
FIG. 3 is an end view of the invention in its working position.

As is apparent from FIG. 1, the device according to the invention includes a pulley 1 provided with attached chain pieces, the pulley being located in the working position in contact with a vehicle wheel 2. The pulley 1 is journalled on a shaft 3 which in turn is fastened to a movable arm 4. The movable arm is pivotally connected to a rigid arm 5 that is fastened to the rear axle casing 6 of the vehicle. The arms 4 and 5 are generally U-shaped with a uniting hinge at their outer ends. Extending between and fastened to the intermediate parts of the U-shaped arms is a more or less hoselike bellows 7 which, by means of a connection 8, can be supplied with pressurized air and can be relieved thereof. When bellows 7 is under pressure, the arms 4 and 5 are moved to the position shown in FIG. 1 due to the effect of the bellows trying to straighten. When the pressure is relieved from the bellows, the arms 5 and 4 are folded together to the position shown in FIG. 2 by springs 10 which are arranged on opposite sides of the hinged connection between the arms. When the bellows once again is inflated, it straightens the arms.

In order to increase the arc of movement and the contact pressure of the pulley against the vehicle wheel, a bolt 9 is arranged between the opposite sides of the U-shaped arm 4. The bellows contacts this bolt when the bellows tries to straighten. This means that the bellows tries to push the bolt sideways which in turn urges the arms towards passing the straight position. In this way the already considerable arc of movement and contact pressure of the pulley are increased. Due to the substantial arc of movement, the pulley is almost entirely inverted in the stored position. This drastically diminishes the space requirement for the device in its entirety. The U-shaped arms being provided with two connecting hinges spaced from one another results in good stability and stiffness despite the low weight of the device. Since movement between the arms is achieved by a simple and cheap bellows, the device according to the invention can be fabricated at very low cost.

What I claim is:

1. An anti-skid device for use with a vehicle having a wheel, said device comprising a rotatable pulley provided with chain pieces, said pulley being journalled to one end of a movable first arm; a second arm rigidly connected at one of its ends to a vehicle and hingedly connected at its opposite end directly to the end of said first arm opposite that to which the pulley is journalled; and inflatable bellows extending between and fastened to the distal ends of the first and second arms, said bellows being operable when inflated to unbold and displace said first arm from a folded position to a substantially straightened position relative to the second arm so as to bring the pulley into contact with said vehicle wheel thereby disposing the claim pieces under the wheel; and spring means operatively associated with said first arm to return the first arm to said folded position when the bellows is deflated.

2. A device according to claim 1 wherein each of said arms contains a U-shaped portion hingedly connected to the U-shaped portion of the other arm, said bellows extending between the respective U-shaped portion of the first and second arms.

3. A device according claim 2, further comprising a bolt spanning the U-shaped portion of said first arm and being positioned so as to be contacted when the bellows is inflated thereby urging the first arm towards a position past said straightened position.

4. A device according to claim 1, wherein said spring means comprises a spiral spring joined at its opposite ends to said first and second arms.

5. A device according to claim 1 wherein said spring means comprises a pair of springs arranged on opposite sides of the hinged connection between the arms of the device, each spring being joined at its opposite ends to said first and second arms.

* * * * *